United States Patent
Okamoto et al.

(10) Patent No.: US 6,821,464 B2
(45) Date of Patent: Nov. 23, 2004

(54) PROCESS FOR PRODUCING POLYMER/FILLER COMPOSITE MATERIAL

(75) Inventors: Hirotaka Okamoto, Aichi (JP); Naoki Hasegawa, Aichi (JP); Arimitsu Usuki, Aichi (JP); Makoto Kato, Aichi (JP); Masami Okamoto, Ohtsu (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 183 days.

(21) Appl. No.: 10/155,999

(22) Filed: May 29, 2002

(65) Prior Publication Data

US 2003/0149156 A1 Aug. 7, 2003

(30) Foreign Application Priority Data

May 30, 2001 (JP) .................................. P2001-163509

(51) Int. Cl.[7] ........................ B29C 44/02; B29C 44/20; B29C 55/00
(52) U.S. Cl. ........................ 264/45.3; 264/50; 264/53; 264/54; 264/288.8; 264/291
(58) Field of Search ........................ 264/288.8, 45.3, 264/50, 51, 53, 54, 291

(56) References Cited

U.S. PATENT DOCUMENTS

| | | | |
|---|---|---|---|
| 4,049,593 A | * 9/1977 | Sato et al. | 521/56 |
| 4,810,734 A | 3/1989 | Kawasumi et al. | |
| 4,894,411 A | 1/1990 | Okada et al. | |
| 5,603,873 A | * 2/1997 | Ingram et al. | 264/45.3 |
| 5,717,000 A | 2/1998 | Karande et al. | |
| 5,773,121 A | * 6/1998 | Meteer et al. | 428/117 |
| 5,936,023 A | 8/1999 | Kato et al. | |
| 5,973,053 A | 10/1999 | Usuki et al. | |
| 6,103,817 A | 8/2000 | Usuki et al. | |
| 6,121,361 A | 9/2000 | Usuki et al. | |
| RE37,385 E | 9/2001 | Okada et al. | |
| 6,472,460 B1 | 10/2002 | Okamoto et al. | |

FOREIGN PATENT DOCUMENTS

| | | |
|---|---|---|
| JP | 2001-123000 | 5/2001 |
| WO | WO 01/05880 | 1/2001 |

* cited by examiner

Primary Examiner—Allan R. Kuhns
(74) Attorney, Agent, or Firm—Oblon, Spivak, McClelland, Maier & Neustadt, P.C.

(57) ABSTRACT

A process for producing a polymer/filler composite material includes a mixture forming step in which there is obtained a mixture of a flake-like filler and a polymer material, and the mean area ($L^2$), mean thickness ($d$) and volume fraction ($c$) of the flake-like filler in the mixture satisfy the following equations (1), (2) and (3):

$$500 \text{ nm}^2 \leq L^2 \leq 100 \text{ μm}^2 \quad (1)$$

$$d \leq L/20 \quad (2)$$

$$0.2d/L \leq c \leq 4d/L \quad (3),$$

and a deforming step of applying deformation to the mixture at a strain rate of no greater than $10 \text{ s}^{-1}$.

19 Claims, 10 Drawing Sheets

PROCESS FOR PRODUCING POLYMER/FILLER COMPOSITE MATERIAL

BACKGROUND OF THE INVENTION

1. Field of the Invention

The present invention relates to a process for producing a polymer/filler composite material, and more specifically it relates to a process for production of a polymer/filler composite material containing a flake-like filler (plate-like filler) which can give film materials and foam bodies with excellent properties such as flexural modulus, strength and impact resistance.

2. Related Background Art

It has been attempted in the past to improve the physical properties and moldability of polymer materials by adding fillers to the polymer materials. In recent years, flake-like fillers derived from layered clay minerals (multi-layered clay minerals) and the like have been the subject of focus as fillers for addition to polymer materials, and for example, U.S. Pat. No. 5,717,000 discloses a polymer foam body obtained by adding an organophilic layered clay mineral with a polyolefin or the like and then foaming it with a foaming agent.

SUMMARY OF THE INVENTION

However, polymer/filler composite materials produced by the process disclosed in the aforementioned publication and other publicly known art publications have not always exhibited adequate properties such as flexural modulus, strength and impact energy. The present inventors attribute the problems of the art to the fact that the dispersed state of the filler in the polymer material is not sufficiently controlled, and no method has been known in the art for dispersion of flake-like fillers such as layered clay minerals in polymer materials in a uniformly regular manner.

The present invention was accomplished in light of these circumstances, and its object is to provide a polymer/filler composite material wherein the dispersed state of the flake-like filler in the polymer material can be controlled, thus allowing production of a polymer/filler composite material with excellent properties such as flexural modulus, strength and impact resistance.

As a result of much diligent research directed toward achieving the object stated above, the present inventors have completed the present invention upon finding that by deforming at a specific strain rate a polymer material having a flake-like filler of a specific size dispersed therein at a specific concentration, it is possible to obtain a polymer/filler composite material with excellent properties such as flexural modulus, strength and impact resistance.

Specifically, the process for producing a polymer/filler composite material according to the invention is characterized by comprising:

forming a mixture of a flake-like filler and a polymer material, wherein the mean area ($L^2$), mean thickness (d) and volume fraction (c) of the flake-like filler in the mixture satisfy the following equations (1), (2) and (3):

$$500 \text{ nm}^2 \leq L^2 \leq 100 \text{ } \mu\text{m}^2 \quad (1)$$

$$d \leq L/20 \quad (2)$$

$$0.2d/L \leq c \leq 4d/L \quad (3),$$

and applying deformation to the mixture at a strain rate of no greater than 10 s$^{-1}$.

Figure 1:
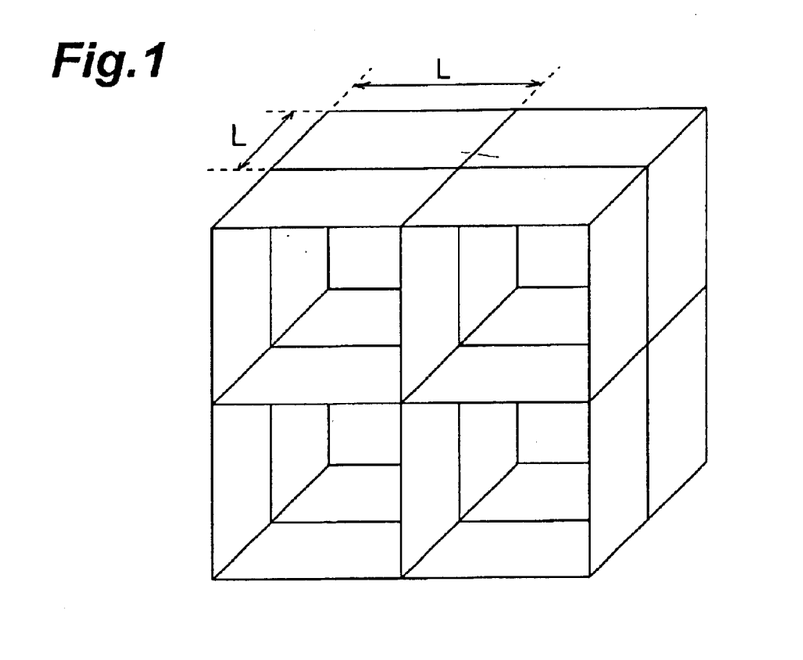
FIG. 1 is an illustration showing a model of the house of card structure of a flake-like filler.

According to the production process of the invention, since a flake-like filler of a size satisfying the conditions of the above equations (1) and (2) is dispersed in a polymer material at a concentration satisfying the above equation (3), the mixture is able to exhibit rheopexy and strain hardening. Also, since the strain rate of the mixture is limited to no greater than 10 s$^{-1}$, the flake-like filler in the polymer material forms three-dimensional clusters. Here, three-dimensional clusters of the flake-like filler refers to formation of "house of card structures" by the flake-like filler in the polymer material, a model structure of which is shown in FIG. 1. According to the invention, formation of a house of card structure by the flake-like filler in the polymer material is believed to be responsible for the improvement in the properties of the polymer/filler composite material, such as flexural modulus, strength and impact resistance.

Figure 2:
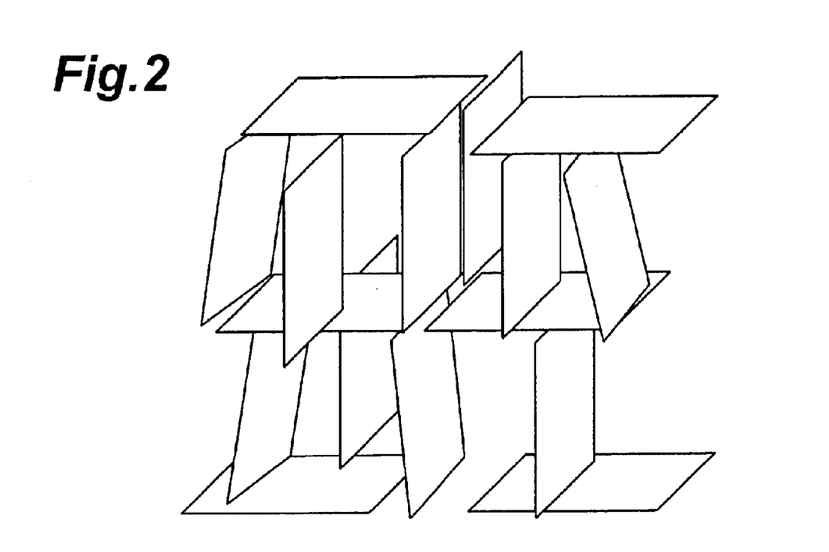
FIG. 2 is an illustration showing a model of the house of card structure of a flake-like filler.

The house of card structure is a structure with the flake-like filler situated ideally with the normals to the flake-like filler sides oriented in the direction of the mutually intersecting x-axis, y-axis and z-axis (that is, the normals of the flake-like filler are mutually intersecting); however house of card structures also include cases where only two axial directions of the x-axis, y-axis and z-axis are in the relationship described above, as shown in FIG. 1. The concentration (number) of the flake-like filler may differ for each of the x-axis, y-axis and z-axis directions. Also, as shown in FIG. 2, it is sufficient if the flake-like filler normals are generally perpendicular, without all of them being perpendicular. That is, while it is ideal for the normals to the flake-like filler surfaces to be parallel to the x-axis, y-axis and z-axis, respectively, the normals and axes may deviate slightly from a parallel relationship, and a house of card structure according to the invention will be considered formed so long as the normals and axes form angles with an average of less than 45° (preferably less than 30° and more preferably less than 15°).

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Preferred embodiments of the invention will now be explained in detail.

The process for producing a polymer/filler composite material according to the invention includes a mixture forming step and a deforming step, as mentioned above.

The mixture forming step will be explained first. In the mixture forming step there is obtained a mixture of a flake-like filler and a polymer material, the mean area ($L^2$), mean thickness (d) and volume fraction (c) of the flake-like filler in the mixture satisfying the following equations (1), (2) and (3):

$$500 \text{ nm}^2 \leq L^2 \leq 100 \text{ } \mu m^2 \quad (1)$$

$$d \leq L/20 \quad (2)$$

$$0.2 d/L \leq c \leq 4 d/L \quad (3).$$

When the mean area of the flake-like filler satisfies $L^2 < 500 \text{ nm}^2$ or $L^2 > 100 \text{ } \mu m^2$, the polymer/filler composite material does not exhibit rheopexy or the strain hardening phenomenon even with deformation. Thus, presumably because no house of card structure is produced, the resulting polymer/filler composite material properties are inadequate. Also, when $L^2 < 500 \text{ nm}^2$ the flake-like filler is too fine and cannot exhibit an adequate reinforcing effect. On the other hand, when $L^2 > 100 \text{ } \mu m^2$, the surface of the molded article fabricated with the polymer/filler composite material becomes rough and less suited for practical use. The mean area ($L^2$) of the flake-like filler more preferably satisfies $1000 \text{ nm}^2 \leq L^2 \leq 25 \text{ } \mu m^2$ and even more preferably $2000 \text{ nm}^2 \leq L^2 \leq 5 \text{ } \mu m^2$.

According to the invention, the mean thickness (d) of the flake-like filler must be such that L>>d, and specifically $d \leq L/20$. When d>L/20, the material does not exhibit rheopexy or the strain hardening phenomenon even with deformation. Thus, presumably because no house of card structure is produced, the resulting polymer/filler composite material properties are inadequate.

The shapes of the flake-like filler surfaces are not particularly restricted, but where the long axis and short axis of the surfaces are represented by n and m respectively, the preferred relationship is $n/m \leq 100$, $m/d \geq 5$. When n/m>100, m/d<5, the filler becomes nearly rod-shaped, such that the polymer/filler composite material will not readily exhibit rheopexy and formation of a house of card structure by deformation will tend to be inhibited.

According to the invention, the volume fraction (c) of the flake-like filler must satisfy the equation 0.2 d/L≦c≦4 d/L. When c<0.2 d/L or c>4 d/L, the polymer/filler composite material does not exhibit rheopexy or the strain hardening phenomenon even with deformation. Thus, presumably because no house of card structure is produced, the resulting polymer/filler composite material properties are inadequate. When c<0.2 d/L, the reinforcing effect of the molded article fabricated with the polymer/filler composite material is reduced, and when c>4 d/L, the molded article becomes hard and brittle, and less suited for practical use. The volume fraction (c) of the flake-like filler more preferably satisfies the equation 0.4 d/L≦c≦3.5 d/L and even more preferably 0.5 d/L≦c≦3 d/L. When the volume fraction is within this range, the rheopexy property is remarkably exhibited and definite strain hardening is observed to form a house of card structure, so that the resulting polymer/filler composite material properties are notably superior. According to the invention, the volume fraction of the flake-like filler is the value (fraction) obtained by dividing the flake-like filler volume by the total volume of the flake-like filler and polymer material, and it is 1/100 of the volume percent (%).

The flake-like filler volume fraction will now be discussed with reference to the model structure shown in FIG. 1. FIG. 1 shows a house of card structure composed of a flake-like filler having square faces with a side length of L and having a thickness of d (L>>d). Assuming that the structure is uniformly formed throughout the entire matrix of the volume pqr (p,q,r >>L), the total number of flake-like filler particles in the matrix is approximately $2pqr/L^3$. Thus, the volume fraction of the flake-like filler when this structure is formed is approximately 2 d/L (200 d/L vol %). FIG. 1 assumes that the flake-like filler is square, but so long as the flake-like filler is not extremely long and thin, the volume fraction of the flake-like filler is believed to be the value described above, this value being considered valid even if the flake-like filler has a shape other than quadrangular.

Even if some of the flake-like filler is missing from part of the structure, it is believed that giant clusters are present throughout the entire matrix up to a certain volume fraction. The lower limit for the volume fraction may be considered the critical point in percolation theory Pc, and it is thought to be in the range of 0.2<Pc<0.6. Consequently, in order to form giant clusters of the flake-like filler throughout the entire matrix, the filler volume fraction is preferably 0.4 d/L or greater. Since a rapid increase in viscosity can occur even if several small clusters are formed instead of a uniform matrix, the lower limit for the flake-like filler volume fraction is 0.2 d/L. Experimentally, a flake-like filler concentration below this value does not produce the strain hardening phenomenon with any deformation applied. It is conjectured that this is either because no house of card structure is formed, or else if formed, the cluster sizes are too small. With small cluster sizes, the effect of increased matrix viscosity is not exhibited.

Based on observation by the present inventors, the production process of the invention sometimes forms a partially disarranged house of card structure such as shown in FIG. 2, and this can result in a higher flake-like filler concentration in a certain direction. This tendency is more notable when using a layered clay mineral derived flake-like filler, as described below. In such cases, a house of card structure is formed even if the flake-like filler volume fraction is higher to some degree, but if the volume fraction increases too much it becomes impossible to form the structure. This is thought to be due to high three-dimensional disorder in the flake-like filler, and from this viewpoint the upper limit for the flake-like filler volume fraction is 4 d/L. When the flake-like filler volume fraction is higher than this value, no strain hardening phenomenon is seen with any deformation applied, and no house of card structure is formed.

According to the invention, the flake-like filler is preferably charged positively or negatively, or else polarized, from the standpoint of facilitating formation of the house of card structure by deformation. The degree of charge or polarization may be as desired, and the rheopexy will be improved and a house of card structure readily formed so long as even slight electrical interaction is present in the flake-like filler. In such cases, an organic ion may be added to the flake-like filler as a charged pair, or a substance which accelerates polarization of the flake-like filler may also be added.

The flake-like filler used for the invention may be any one which satisfies the conditions stated above, and its type is not particularly restricted. The flake-like filler need not satisfy the conditions before being added to the polymer material, as it is only necessary that it satisfy the conditions after forming the mixture with the polymer material. Flake-like fillers derived from layered clay minerals are preferred, and among them, layered clay minerals whose surfaces have been organophilicly treated for fine dispersion in each layer of the polymer material are particularly preferred. When a layered clay mineral is used as the flake-like filler, the layered clay mineral need not be thoroughly dispersed in each layer, and several layers may overlap. In such cases, the thickness d of the flake-like filler is the average value in consideration of the overall overlapping thickness.

Here, a layered clay mineral is a laminar phyllosilicate, and examples of such layered clay minerals include smectite layered clay minerals such as montmorillonite, saponite, hectorite, beidellite, stevensite and nontronite, as well as vermiculite, halloysite, swelling mica and kaolinite. These may be in natural or synthetic forms. An organophilic layered clay mineral is a layered clay mineral which has been organophilicly treated with an organic onium ion. Typical organic onium ions are alkylonium ions of 6 or more carbons. If the number of carbons is less than 6 the hydrophobicity of the organic onium ion is lower, and this may result in lower compatibility when the layered clay mineral is dispersed in a polyolefin-based oligomer or polyolefin resin used as the polymer material.

In selecting the layered clay mineral, one with a larger contact area with the polymer material to which it is added is preferred since dispersion can be achieved with a wider interlayer distance of the layered clay mineral. The cation-exchange volume of the layered clay mineral is preferably 50–200 millimolar equivalents/100 g. If the cation-exchange volume is less than 50 millimolar equivalents/100 g, organophilic treatment by organic onium ion-exchange will tend to be insufficient, often resulting in inadequate dispersion of the layered clay mineral. On the other hand, if the cation-exchange volume is greater than 200 millimolar equivalents/ 100 g, the binding force between the layered clay mineral layers is stronger, hampering intervention between the layers by the organic onium ion-exchange, and resulting in inadequate dispersion of the laminar clay material.

As organic onium ions there may be used primary to quaternary ammonium ions or phosphonium ions. As ammonium ions there may be mentioned hexylammonium ion, octylammonium ion, 2-ethylhexylammonium ion, dodecylammonium ion, laurylammonium ion, octadecylammonium ion, dioctyldimethylammonium ion, trioctylammonium ion, dioctadecyldimethylammonium ion, trioctadecylammonium ion, dimethylbenzyloctadecylammonium ion and dimethyloctadecylammonium ion, and as phosphonium ions there may be mentioned tetraethylphosphonium ion, triethylbenzylphosphonium ion, tetra-n-butylphosphonium ion, tri-n-butylhexadecylphosphonium ion and tri-n-butylbenzylphosphonium ion.

The polymer material which forms the mixture with the aforementioned flake-like filler according to the invention is not particularly restricted, but at least a portion of the polymer material is preferably a polymer material with a polar group. As polar groups there may be mentioned polarized groups, acidic groups and basic groups. Using a polymer material which includes a polymer material with a polar group will facilitate formation of a house of card structure by the flake-like filler with deformation.

As polymer materials to be used for the invention there may be mentioned polyesters (polyethylene naphthalate, polyethylene terephthalate, polybutylene terephthalate, etc.), polycarbonates, polyacetals, polyallylates, polyamides, polyamideimides, polyetherimides, polyphenylene ethers, polyphenylene sulfides, polyethersulfones, polyetherketones, polyphthalamide, polyethernitrile, polybenzimidazoles, polycarbodiimides, polysiloxanes, acrylic resins (polymethyl(meth)acrylate, poly(meth) acrylamide, etc.), acrylic rubber, polytetrafluoroethylene, fluorocarbon resins, fluoro rubber, liquid crystal polymers, epoxy resins, melamine resins, urea resins, diallyl phthalate resins, phenolic resins, polysilanes, silicone resins, urethane resins, polyethylene, polypropylene, polybutene, polypentene, ethylene-propylene copolymer, ethylene-butene copolymer, polybutadiene, polyisoprene, hydrogenated polybutadiene, hydrogenated polyisoprene, ethylene-propylene-diene copolymer, ethylene-butene-diene copolymer, butyl rubber, polymethylpentene, polystyrene, styrene-butadiene copolymer, styrene-hydrogenated butadiene copolymer, polyvinyl chloride, polyvinylidene chloride, polyvinyl fluoride, polyvinylidene fluoride, polyvinyl alcohol, poly(ethylene-vinyl alcohol) copolymer (EVOH), polyvinyl butyral, cellulose acetate, polylactic resin, polyhydroxy butyrate, polycaprolactone, polybutylene succinate, polyethylene succinate, acrylonitrile-butadiene-styrene copolymer (ABS) and acrylonitrile-butadiene rubber (NBR). These polymer materials may be used alone or in combinations (blends or alloys) of two or more.

When a layered clay mineral is used as the flake-like filler, the process employed for production of the mixture of the flake-like filler and polymer material may be a process whereby the layered clay mineral is first organic-treated, and then the organophilic layered clay mineral is mixed with the polymer material.

The organophilic treatment of the layered clay mineral may be carried out, for example, in the following manner. When the layered clay mineral is in lump form, it is first pulverized to a powder using a ball mill or the like. A mixer is then used to disperse the powder in water to obtain an aqueous dispersion of the layered clay mineral. Separately, an aqueous solution is prepared containing the organic onium ion as the organic agent. This aqueous solution is added to the aqueous dispersion of the layered clay mineral and mixed therewith, for ion-exchange of the inorganic ion in the layered clay mineral with the organic onium ion, and then the water is removed from the mixture to obtain the organophilic layered clay mineral. The dispersion medium used here may be methanol, ethanol, propanol, isopropanol or ethylene glycol instead of water, or else mixtures of these or mixtures therefore with water may alternatively be used.

Next, the organophilic layered clay mineral is mixed with the polymer material. When the polymer material is soluble or dispersible in solvents such as water or organic solvents, the organophilic layered clay mineral and polymer material may be mixed by dispersing and dissolving them in the solvent such as water or an organic solvent, and then removing the solvent.

The process used may also accomplish mixture of the polymer material and the organophilic layered clay mineral by heating them at above the melting temperature or softening temperature of the polymer material. During the heating, shear force is preferably applied for uniform dispersion of the organophilic layered clay mineral, and an extruder is preferably used as the means for applying shear force while heating. An organic solvent, oil or the like may be added during this time, and the polymer may be subjected to crosslinking and/or vulcanization either after or during dispersion of the layered clay mineral.

Instead of the process described above, a mixture may be obtained by, for example, adding the organophilic layered clay mineral to the monomer for the polymer material, and polymerizing the monomer in the presence of the organophilic layered clay mineral. Also, when the polymer material is produced by reacting a mixture of two or more components such as polyurethanes or polyesters, the mixture may be obtained by first adding the organophilic layered clay mineral to at least one of the components before the reaction.

The deforming step in the process for production of a polymer/filler composite material according to the invention will now be explained. In the deforming step, deformation is applied to the mixture of the flake-like filler and polymer material at a strain rate of no greater than $10 \text{ s}^{-1}$.

When the strain rate for deformation of the mixture exceeds $10 \text{ s}^{-1}$, the strain rate is too high for the flake-like filler to form a house of card structure. As a result, no strain hardening phenomenon is observed and the properties of the obtained polymer/filler composite material are inadequate. The strain rate ($\gamma'$) according to the invention is in the range of preferably $0.0001 \text{ s}^{-1} \leq \gamma' \leq 5 \text{ s}^{-1}$, and more preferably $0.0005 \text{ s}^{-1} \leq \gamma' \leq 2 \text{ s}^{-1}$. If the strain rate is less than $0.0001 \text{ s}^{-1}$, more time will tend to be required for deformation, and this may create problems in terms of practical use.

In the deformation step, the temperature (T) which produces deformation is preferably such that $T \geq Tm-30° C.$, where Tm is the melting point of the matrix polymer material when it has a melting point. When the matrix polymer material is amorphous or has a low degree of crystallization and exhibits fluidity near or above the glass transition temperature (Tg), the temperature is preferably such that $T \geq Tg-30° C$. When the polymer material includes a plasticizer and the Tm and Tg are therefore lower than the original values, T may be appropriately selected to correspond to the degree in reduction. A temperature below the above-mentioned temperature ranges results in poor deformation flow properties and tends to hamper formation of a house of card structure by the flake-like filler.

According to the invention, the deformation at a strain rate of no greater than $10 \text{ s}^{-1}$ is preferably carried out by stretching or foaming. Drawing includes uniaxial stretching and biaxial stretching, as well as blow molding. Foaming may be accomplished by any publicly known foaming method, such as a method of impregnating the resin (mixture of the flake-like filler and polymer material) with a hydrocarbon such as butane or pentane or carbon dioxide gas under heat and pressure and then heating the foamable resin in a mold (gas impregnation, in-mold heat foaming method), a method of thoroughly kneading the resin, a foaming agent and a foam nucleating agent in an extruder barrel and passing it through a die while releasing it at air pressure (extrusion, atmospheric pressure physical foaming method), a method of injecting a physical foaming agent directly into an injection molding machine and mixing it with the resin, or blending a chemical foaming agent with the resin before loading into an injection molding machine, and then introducing the foam pressure of gas generated by thermal decomposition into the injection die for foam molding (injection foam molding method), a method of gasifying a decomposing foam agent mixed with the resin in a hot press and accomplishing foaming as the pressure is removed (press foaming method), or a method of foaming using carbon dioxide gas or water generated during the reaction of the resin during its polymerization reaction (chemical reaction method). As foaming agents there may be used chemical foaming agents which utilize gas generated by thermal decomposition, or physical foaming agents which are carbon dioxide gas or inert gas injected, impregnated and released. Particularly when a physical foaming agent is used, the foaming is preferably carried out by impregnating and mixing the foaming agent into the resin under pressure and heat conditions in which the foaming agent is in a supercritical state, and then reducing the pressure and if necessary reheating.

When a layered clay mineral-derived filler is used as the flake-like filler and the mixture is stretched by uniaxial or biaxial stretching at a strain rate of no greater than $10 \text{ s}^{-1}$, the layered clay mineral will tend to align along two directions, namely the direction perpendicular to the direction of elongation (stretching) and the direction parallel to the direction of elongation but perpendicular to the direction of thickness of the laminar molded article, thus forming a house of card structure, and improving the tensile modulus and impact energy of the resulting polymer/filler composite material. On the other hand, when a mixture of the same composition is deformed by foaming at a strain rate of no greater than $10 \text{ s}^{-1}$, the layered clay mineral will tend to align along the direction of thickness of the partitions separating the voids and the direction perpendicular to their thickness direction, forming a house of card structure, and improving the properties such as flexural modulus and flexural strength of the resulting foam body. Consequently, the polymer/filler composite material obtained by the production process of the invention can be suitably applied in fields which require properties such as a high flexural modulus and flexural strength.

EXAMPLES

Preferred examples of the invention will now be explained in detail, with the understanding that the invention is in no way limited thereby.

Example 1

In 5000 mL of water at 80° C. there was dispersed 80 g of sodium montmorillonite (Kunipia F, product of Kunimine Kogyo Co.; cation-exchange volume: 119 millimolar equivalents/100 g) as a flake-like filler. Separately, 28.5 g of octadecylamine as an organophilic treatment agent and 11 mL of concentrated hydrochloric acid were dissolved in 2000 mL of water at 80° C. The solution was added to the aqueous dispersion of sodium montmorillonite to obtain organophilic montmorillonite (hereinafter referred to as "C18-Mt"). The obtained C18-Mt was washed three times with water at 80° C. and then lyophilized and ground. The inorganic portion of the C18-Mt as determined by burning off was 68 wt %.

Next, the C18-Mt was added to a maleic acid-modified polypropylene resin (PO1015 by Exxon Chemical Corp., melting point: 145° C.) at 4 wt % in terms of the inorganic portion. The mixture was melt kneaded using a twin-screw extruder (TEX30α, product of JSW) to obtain a mixture with C18-Mt dispersed in the maleic acid-modified polypropylene resin. A transmission electron microscope (TEM) photograph of the mixture showed that the layered clay mineral in the obtained mixture exists as strata of each layer.

Since the mean area ($L^2$) of one layer of Kunipia F is 10,000 nm² and the mean thickness (d) is 1 nm, equation (2) is satisfied by d≦5 nm. That is, the conditions of both equations (1) and (2) are satisfied in Example 1. Also, while the equation of (3) results as 0.002≦c≦0.04 under these conditions, the density of PO1015 is 0.86 g/cm³ and the density of Kunipia F is 2.5 g/cm³ and therefore the volume fraction of the flake-like filler is 0.014, such that the condition of equation (3) is also satisfied in Example 1.

Figure 3:
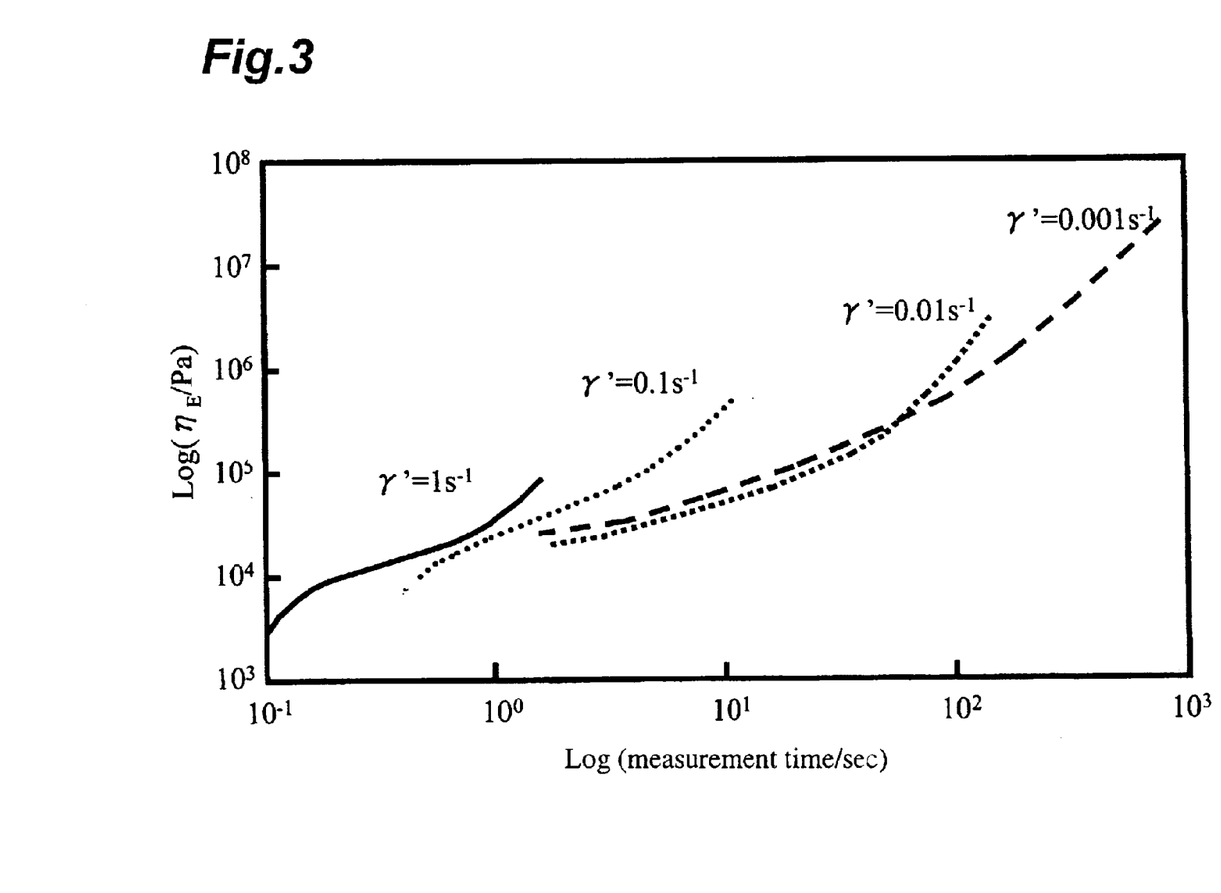
FIG. 3 is a graph showing time-dependent change in elongation viscosity of a test piece obtained in Example 1.

Next, a rectangular test piece was prepared from the obtained mixture using an injection molding machine (PS40E2ASE, product of Nissei Plastic Industrial Co., Ltd.). An elongation viscosity tester (product of Toyota Technological Institute) was then used to measure the time-dependent change in elongation viscosity of the test piece. The results are shown in FIG. 3. For this measurement, the measurement temperature was 150° C. and the strain rate (here meaning the true strain rate, and therefore the deformation rate increases as elongation proceeds) was 0.001–1 s$^{-1}$.

Figure 4:
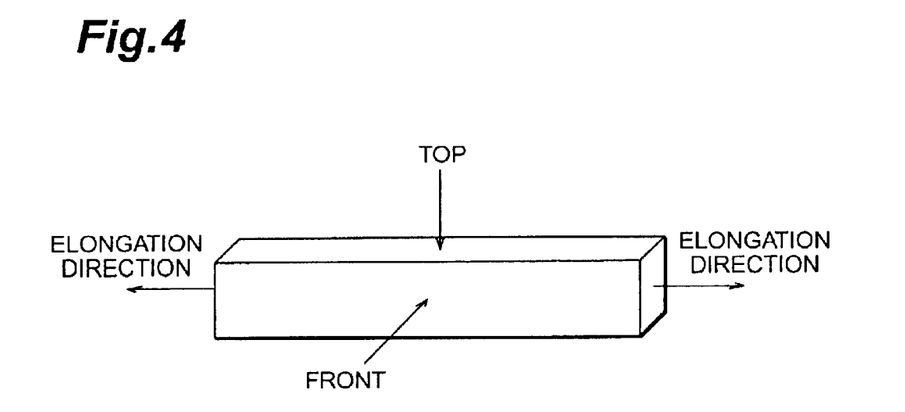
FIG. 4 is a schematic view of a test piece for transmission electron microscope (TEM) observation, which has been cut from a test piece after measurement of the time-dependent change in elongation viscosity in Example 1.
Figure 5:
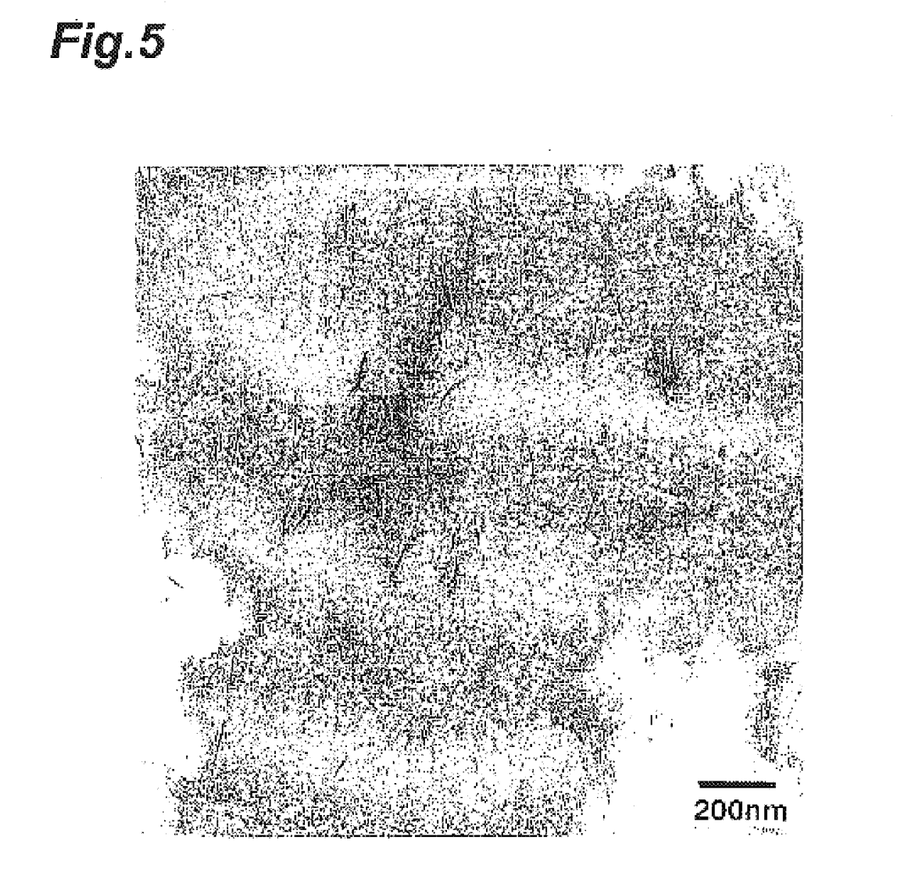
FIG. 5 is a TEM photograph of a test piece for TEM observation in Example 1, photographed from the top of the schematic view in FIG. 4.
Figure 6:
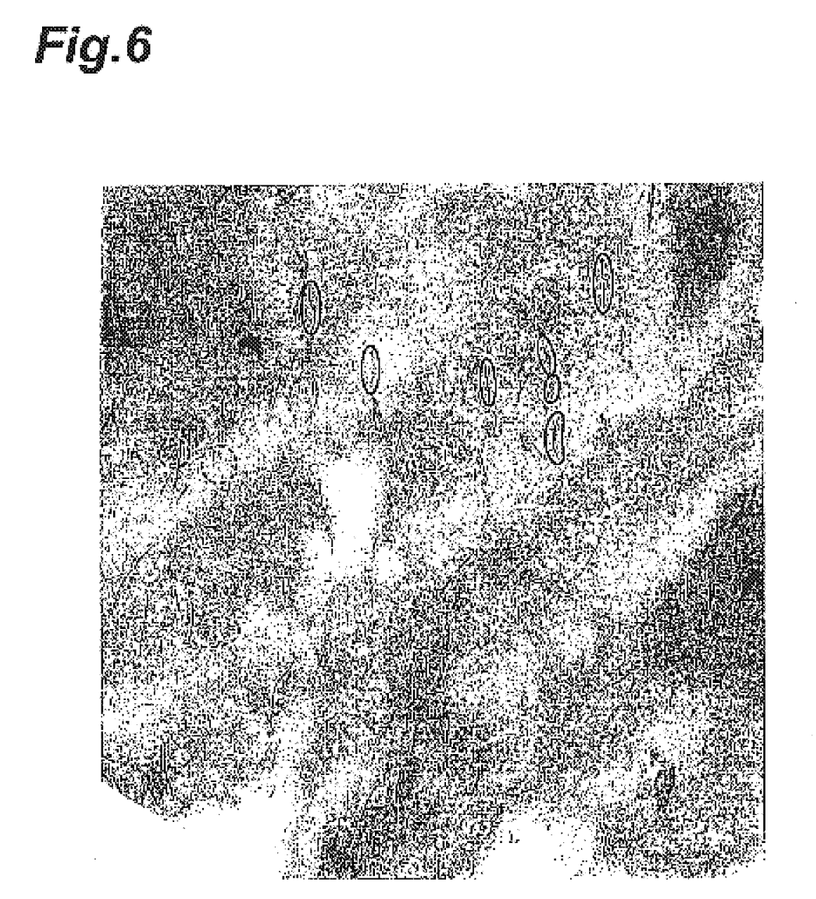
FIG. 6 is a TEM photograph of a test piece for TEM observation in Example 1, photographed from the front of the schematic view in FIG. 4.

Also, a test piece for TEM observation such as shown in FIG. 4 was cut out from the test piece after measurement of the time-dependent change in elongation viscosity, and the orientation of the flake-like filler was observed from the front and the top of the test piece with the TEM. A TEM photograph as seen from the top is shown in FIG. 5, and a TEM photograph as seen from the front is shown in FIG. 6.

Comparative Example 1

Figure 7:
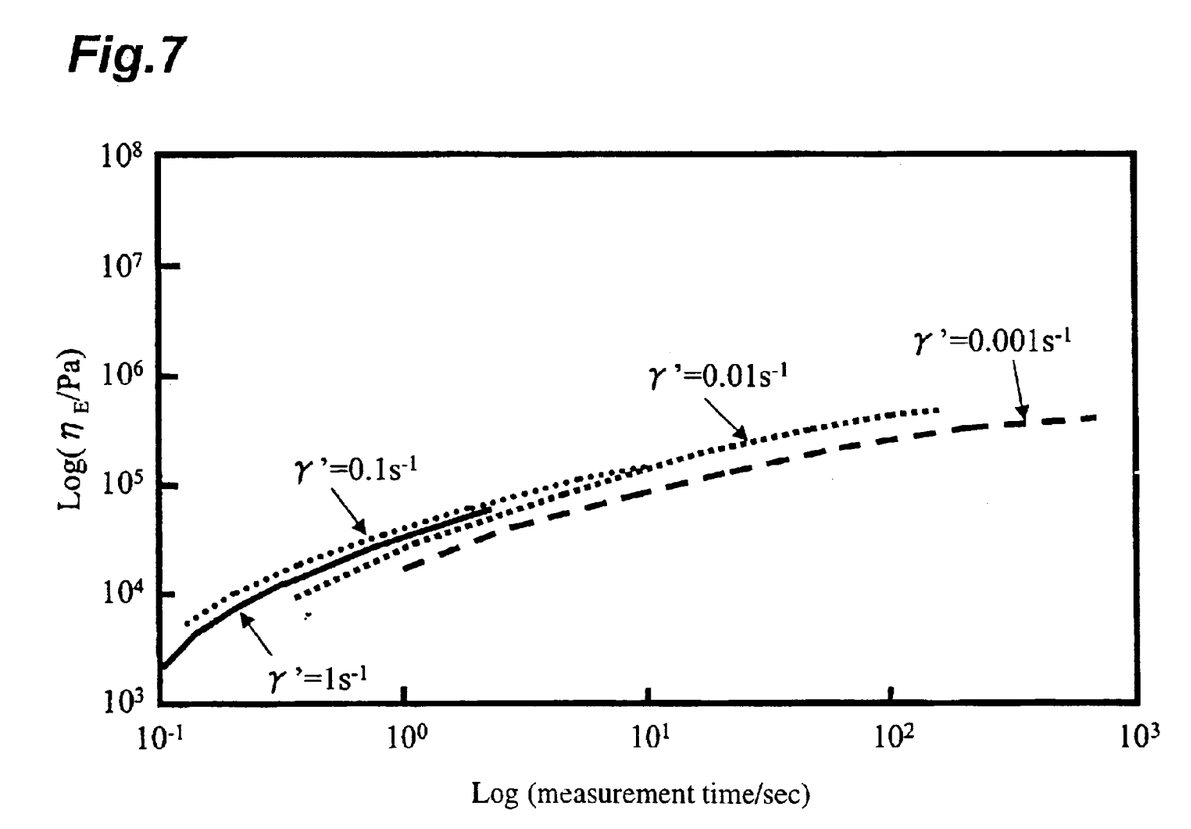
FIG. 7 is a graph showing time-dependent change in elongation viscosity for Comparative Example 1.

A maleic acid-modified polypropylene resin (PO1015 by Exxon Chemical Corp., melting point: 145° C.) containing no flake-like filler was used and the time-dependent change in elongation viscosity was measured in the same manner as Example 1. The results are shown in FIG. 7.

Comparative Examples 2–3

The time-dependent change in elongation viscosity was measured in the same manner as Example 1 except that the volume fractions of Kunipia F were 0.0018 and 0.042.

The above experimental results demonstrate that the mixture obtained in Example 1 exhibits a strain hardening phenomenon in an elongation strain rate range of 0.001–1 s$^{-1}$ (FIG. 3). On the other hand, it was also shown that the maleic acid-modified polypropylene resin containing no flake-like filler exhibits absolutely no strain hardening phenomenon in an elongation strain rate range of 0.001–1 s$^{-1}$ (FIG. 7), and also that absolutely no strain hardening phenomenon is exhibited in the same elongation strain rate range by Comparative Examples 2–3 wherein the flake-like filler volume fraction failed to satisfy equation (3).

Figure 8:
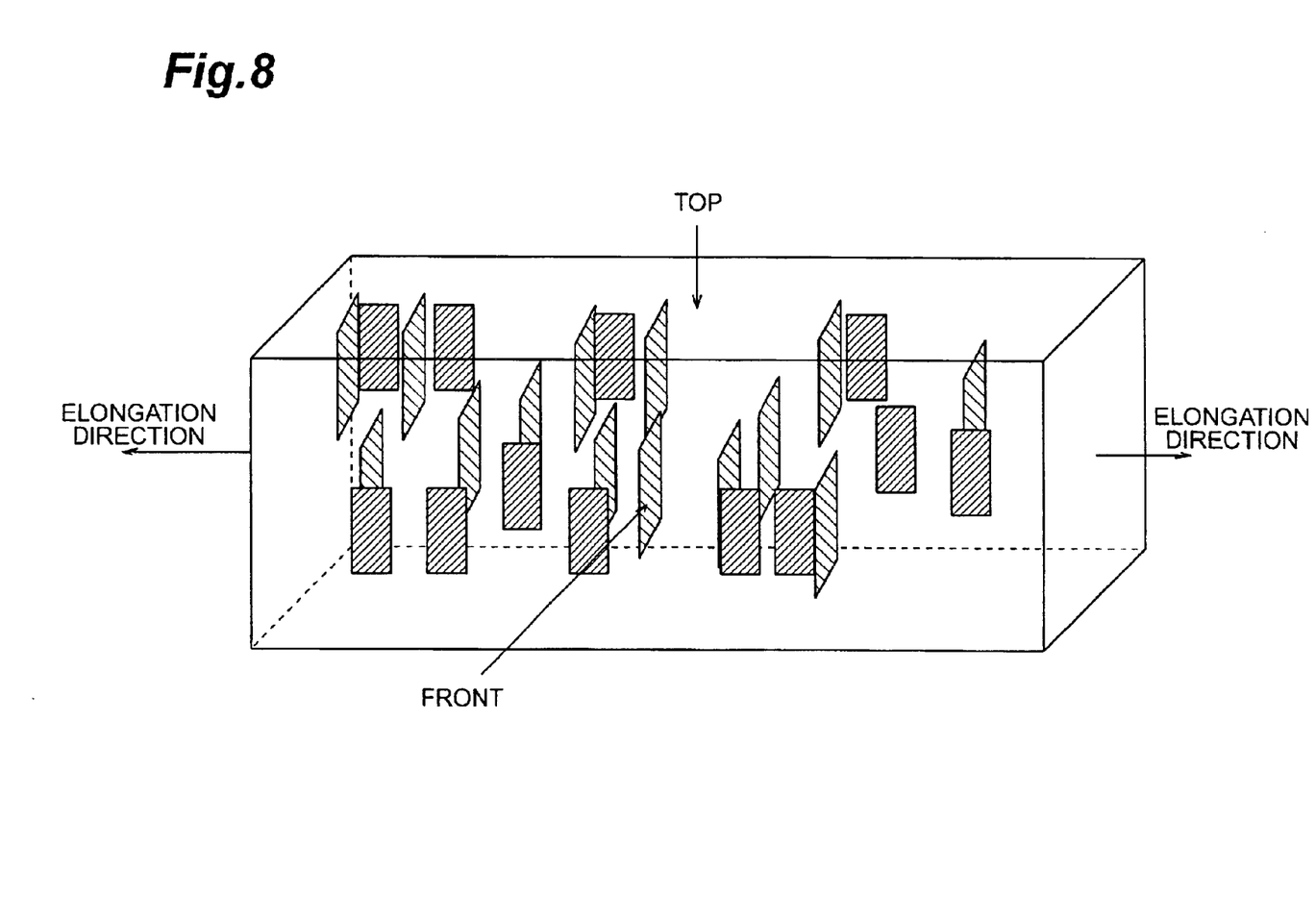
FIG. 8 is a schematic view of the state of orientation of a flake-like filler in a test piece for TEM observation in Example 1.

As shown in FIGS. 5 and 6, the flake-like filler had oriented to form a house of card structure in the test pieces after measurement of the time-dependent change in elongation viscosity, in two directions, namely, the direction perpendicular to the elongation direction and the direction parallel to the elongation direction but perpendicular to the direction of thickness of the test piece. (The house of card structure is shown schematically in FIG. 8.) The solid-line circled flake-like filler particles in FIG. 6 are those oriented in the direction perpendicular to the plane of the paper, and the dotted-line circled flake-like filler particles are those oriented in the direction parallel to the plane of the paper.

Example 2

Figure 9:
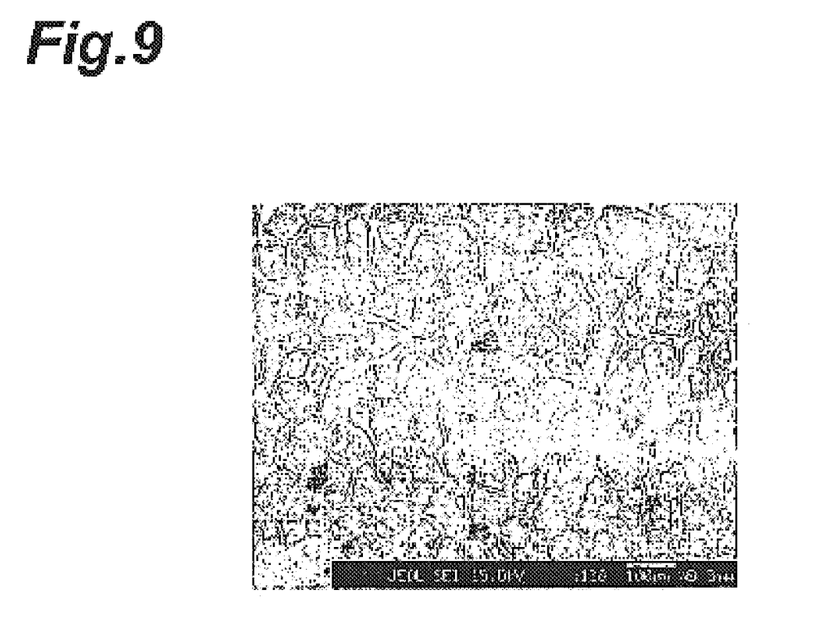
FIG. 9 is an SEM photograph of the foam body obtained in Example 2.
Figure 10:
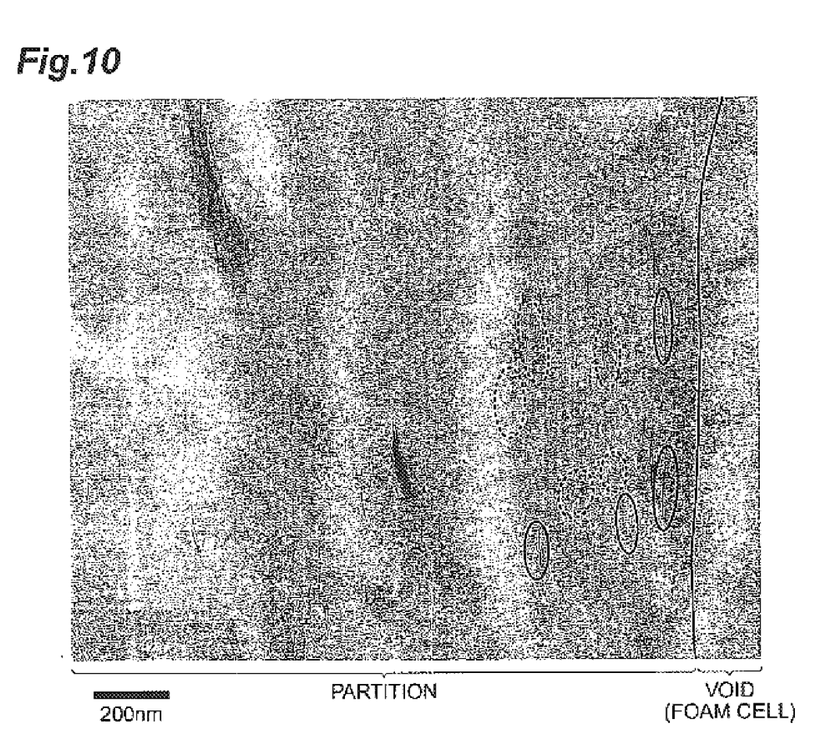
FIG. 10 is a TEM photograph of a partition in the foam body obtained in Example 2.

After placing the mixture obtained in Example 1 and 40 g of dry ice in a 100 mL volume autoclave (product of Toyota Central R&D Labs, Inc.), the valve-equipped cover was closed and the autoclave was immersed in an oil bath heated to 140° C. After standing for one hour so that the mixture sufficiently absorbed the carbon dioxide in a supercritical state by the heating, the autoclave was removed from the oil bath, and the valve was abruptly opened to create rapid pressure reduction in the autoclave for foaming at a strain rate of no greater than 10 s$^{-1}$. A freeze-fracture was obtained from the foam body, and the foamed state was observed with a scanning electron microscope (SEM). The obtained SEM photograph is shown in FIG. 9. An ultrathin strip was cut from a partition separating the voids (foam cells) of the foam, and the oriented state of the flake-like filler was observed by TEM. The obtained TEM photograph is shown in FIG. 10.

Comparative Example 4

A maleic acid-modified polypropylene resin (PO1015 by Exxon Chemical Corp., melting point: 145° C.) containing no flake-like filler was used to produce a foam body in the same manner as Example 2, and an SEM photograph was obtained. The obtained SEM photograph is shown in FIG. 11.

Figure 11:
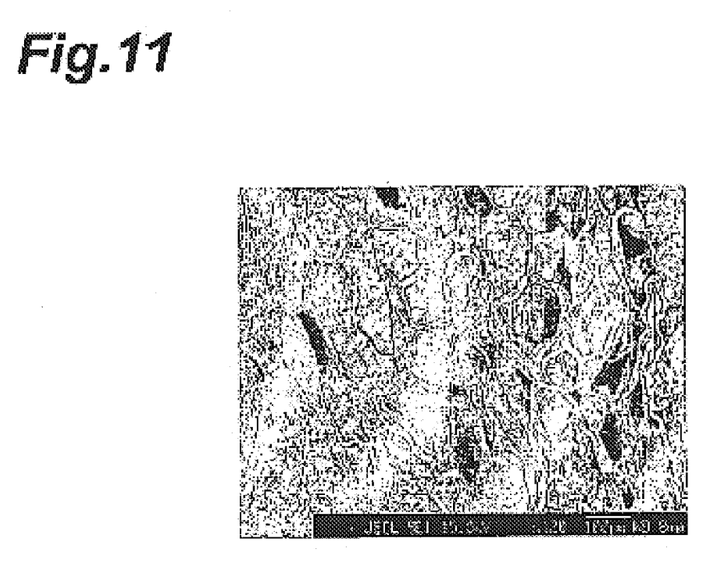
FIG. 11 is an SEM photograph of the foam body obtained in Comparative Example 4.

The results of electron microscope observation showed that the foam body of Example 2 had numerous satisfactory voids (foam cells) as shown in FIG. 9, whereas the foam body of Comparative Example 4 had voids (foam cells) but many of them exhibited a disintegrated or crushed form, as shown in FIG. 11. Also, the partitions of the foam of Example 2 were seen to include flake-like filler particles with horizontally oriented faces with respect to the direction of thickness of the partitions and flake-like filler particles with vertically oriented faces, such that the flake-like filler formed a house of card structure by the partition sections (FIG. 10). The solid-line circled flake-like filler particles in FIG. 10 are those oriented in the direction perpendicular to the plane of the paper, and the dotted-line circled flake-like filler particles are those oriented in the direction parallel to the plane of the paper.

Experiment on Properties for Examples 1 and 2 and Comparative Examples 1 and 4

Rectangular test pieces obtained in Example 1 and Comparative Example 1 and test pieces carefully cut out from the foam bodies obtained in Example 2 and Comparative Example 4 so as to include no cracks, were used for a bending test according to JIS K7171 to determine the flexural modulus and flexural strength. The density of each test piece was also measured, the flexural modulus and flexural strength were each divided by the density to calculate the flexural modulus and flexural strength per unit density, and the results were recorded as the specific flexural modulus and specific strength. The results are summarized in Table 1 below.

TABLE 1

|  | Density (g/cm³) | Flexural modulus (GPa) | Flexural strength (MPa) | Specific flexural modulus (Pa · cm³/g) | Specific strength (Pa · cm³/g) |
| --- | --- | --- | --- | --- | --- |
| Example 1 | 0.92 | 1.25 | 39.7 | 1.36 | 43.2 |
| Comp. Ex. 1 | 0.86 | 1.10 | 33.5 | 1.28 | 39.0 |
| Example 2 | 0.15 | 0.24 | 11.3 | 1.60 | 75.3 |
| Comp. Ex. 4 | 0.33 | 0.20 | 8.4 | 0.61 | 25.5 |

Upon comparison of Example 1 and Comparative Example 1 which were non-foam bodies and Example 2 and Comparative Example 2 which were foam bodies, it was found that both of the examples had superior measured values for the flexural modulus and flexural strength, as well as superior values for the specific flexural modulus and specific strength obtained by compensating for unit density. Example 2, despite being a foam body, had much larger values for the specific flexural modulus and specific strength than the other examples or the comparative examples, which suggested formation of a satisfactory house of card structure.

Example 3

A small table press (Model TW-07 by Takachiho Seiki Co., Ltd.) was used for press molding of the mixture obtained in Example 1 at 200° C., to fabricate a film with a thickness of 1 mm. The film was uniaxially stretched using a film stretching system (Model SS-60 Film Stretching System by Shibayama Scientific Co., Ltd.) at an initial strain rate of 0.5 $s^{-1}$ (meaning the engineering strain rate, as the true strain rate decreases with increased stretching. The deformation rate was constant.) and a temperature of 130° C., to obtain a stretched film with a thickness of 0.5 mm.

Comparative Example 5

The same small table press as in Example 3 was used for press molding of the mixture obtained in Example 1 at 200° C. to fabricate a film with a thickness of 0.5 mm. The obtained film was an unstretched film.

Comparative Example 6

After fabricating a film in the same manner as Example 3 except for using a maleic acid-modified polypropylene resin (PO1015 by Exxon Chemical Corp., melting point: 145° C.) containing no flake-like filler instead of the mixture obtained in Example 1, it was uniaxially stretched in the same manner as Example 3 to obtain a stretched film with a thickness of 0.5 mm.

Example 4

Maleic acid-modified linear low-density polyethylene (Fusabond MB-226D by DuPont Corp.) and C18-Mt were used to prepare a mixture in the same manner as Example 1. Since the C18-Mt was added at 4 wt % in terms of the inorganic portion and the density of the Fusabond MB-226D was 0.92 $g/cm^3$, the volume fraction of the flake-like filler was 0.015, and therefore all of the conditions of equations (1) to (3) were satisfied in Example 4. Upon TEM observation of the obtained mixture, almost all of the flake-like filler (layered clay mineral) was dispersed in each layer. The obtained mixture was then used to fabricate a film with a thickness of 1 mm in the same manner as Example 3 which was then uniaxially stretched in the same manner as Example 3 to obtain a stretched film with a thickness of 0.5 mm. The temperature for the uniaxial stretching was 110° C.

Comparative Example 7

The same small table press as in Example 3 was used for press molding of the mixture obtained in Example 4 at 200° C. to fabricate a film with a thickness of 0.5 mm. The obtained film was an unstretched film.

Comparative Example 8

After fabricating a film in the same manner as Example 4 except for using Fusabond MB-226D containing no flake-like filler instead of the mixture of Fusabond MB-226D and C18-Mt, it was uniaxially stretched in the same manner as Example 4 to obtain a stretched film with a thickness of 0.5 mm.

Example 5

Nylon 6 (1022B by Ube Industries, Ltd., melting point: 220° C.) and C18-Mt were used to prepare a mixture in the same manner as Example 1. Since the C18-Mt was added at 4 wt % in terms of the inorganic portion and the density of the 1022B was 1.13 $g/cm^3$, the volume fraction of the flake-like filler was 0.018, and therefore all of the conditions of equations (1) to (3) were satisfied in Example 5. Upon TEM observation of the obtained mixture, almost all of the flake-like filler (layered clay mineral) was dispersed in each layer. The obtained mixture was then used to fabricate a film with a thickness of 1 mm in the same manner as Example 3, and the film was then uniaxially stretched in the same manner as Example 3 to obtain a stretched film with a thickness of 0.5 mm. The temperature for the uniaxial stretching was 110° C.

Comparative Example 9

The same small table press as in Example 3 was used for press molding of the mixture obtained in Example 5 at 200° C. to fabricate a film with a thickness of 0.5 mm. The obtained film was an unstretched film.

Comparative Example 10

After fabricating a film in the same manner as Example 5 except for using 1022B containing no flake-like filler instead of the mixture of 1022B and C18-Mt, it was uniaxially stretched in the same manner as Example 5 to obtain a stretched film with a thickness of 0.5 mm.

Experiment on Properties for Examples 3–5 and Comparative Examples 5–10

The stretched films of Examples 3–5 and Comparative Examples 6, 8 and 10 and the unstretched films of Comparative Examples 5, 7 and 8 were used to determine the impact energy and tensile modulus of each according to JIS K7142 and JIS K7127. The results are summarized in Table 2 below.

TABLE 2

|  | Tensile modulus (MPa) | Impact energy (kg/mm) |
|---|---|---|
| Example 3 | 850 | 5.2 |
| Comp. Ex. 5 | 740 | 3.2 |
| Comp. Ex. 6 | 650 | 2.5 |
| Example 4 | 760 | 9.0 |
| Comp. Ex. 7 | 630 | 8.3 |
| Comp. Ex. 8 | 600 | 7.2 |
| Example 5 | 1200 | 3.7 |
| Comp. Ex. 9 | 1080 | 2.5 |
| Comp. Ex. 10 | 1020 | 1.9 |

Table 2 shows that the stretched films of Examples 3–5 exhibit superior tensile modulus and impact energy values compared to the unstretched films (Comparative Examples 5, 7 and 9) which, while having the same composition, were not stretched and thus lacked house of card structure formation by the flake-like filler, or the stretched films (Comparative Examples 6, 8 and 10) which contained no flake-like filler despite being stretched.

As explained above, it is possible according to the present invention to provide a process for production of polymer/filler composite materials wherein the dispersed state of flake-like fillers dispersed in the polymer materials can be controlled, thus allowing production of polymer/filler composite materials with excellent properties such as flexural modulus, strength and impact resistance.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A process for producing a polymer/filler composite material comprising:

forming a mixture of a flake-like filler and a polymer material, wherein the mean area ($L^2$), mean thickness (d) and volume fraction (c) of said flake-like filler in said mixture satisfy the following equations (1), (2) and (3):

$$500 \text{ nm}^2 \leq L^2 \leq 100 \text{ }\mu\text{m}^2 \quad (1)$$

$$d \leq L/20 \quad (2)$$

$$0.2d/L \leq c \leq 4d/L \quad (3),$$

and applying deformation to said mixture at a strain rate of no greater than 10 s$^{-1}$.

2. A process for producing a polymer/filler composite material according to claim 1, wherein said deformation is accomplished by stretching.

3. A process for producing a polymer/filler composite material according to claim 1, wherein said deformation is accomplished by foaming.

4. A process for producing a polymer/filler composite material according to claim 1, wherein said flake-like filler is derived from a layered clay mineral.

5. A process for producing a polymer/filler composite material according to claim 2, wherein said flake-like filler is derived from a layered clay mineral.

6. A process for producing a polymer/filler composite material according to claim 3, wherein said flake-like filler is derived from a layered clay mineral.

7. A process for producing a polymer/filler composite material according to claim 1, wherein at least a portion of said polymer material is a polymer material with a polar group.

8. A process for producing a polymer/filler composite material according to claim 2, wherein at least a portion of said polymer material is a polymer material with a polar group.

9. A process for producing a polymer/filler composite material according to claim 3, wherein at least a portion of said polymer material is a polymer material with a polar group.

10. A process for producing a polymer/filler composite material according to claim 4, wherein at least a portion of said polymer material is a polymer material with a polar group.

11. A process for producing a polymer/filler composite material according to claim 5, wherein at least a portion of said polymer material is a polymer material with a polar group.

12. A process for producing a polymer/filler composite material according to claim 6, wherein at least a portion of said polymer material is a polymer material with a polar group.

13. The process as claimed in claim 4, wherein the cation-exchange volume of the layered clay mineral is from 50 to 200 millimolar equivalents/100 g.

14. The process as claimed in claim 1, wherein the filler is a montmorillonite.

15. The process as claimed in claim 1, wherein the polymer material is a polypropylene resin modified by maleic acid.

16. The process as claimed in claim 1, wherein the flake-like filler comprises particles having at least one square surface.

17. The process as claimed in claim 4, wherein the flake-like filler is a layered clay mineral treated with an organic onium ion.

18. The process as claimed in claim 17, wherein the onium ion is a quaternary ammonium or phosphonium ion.

19. The process as claimed in claim 1, wherein the flake-like filler has at least one flat surface.

* * * * *